A. P. K. BERG.
ROAD SCRAPER AND LAND LEVELER.
APPLICATION FILED NOV. 28, 1919.
1,351,277.
Patented Aug. 31, 1920.
2 SHEETS—SHEET 1.
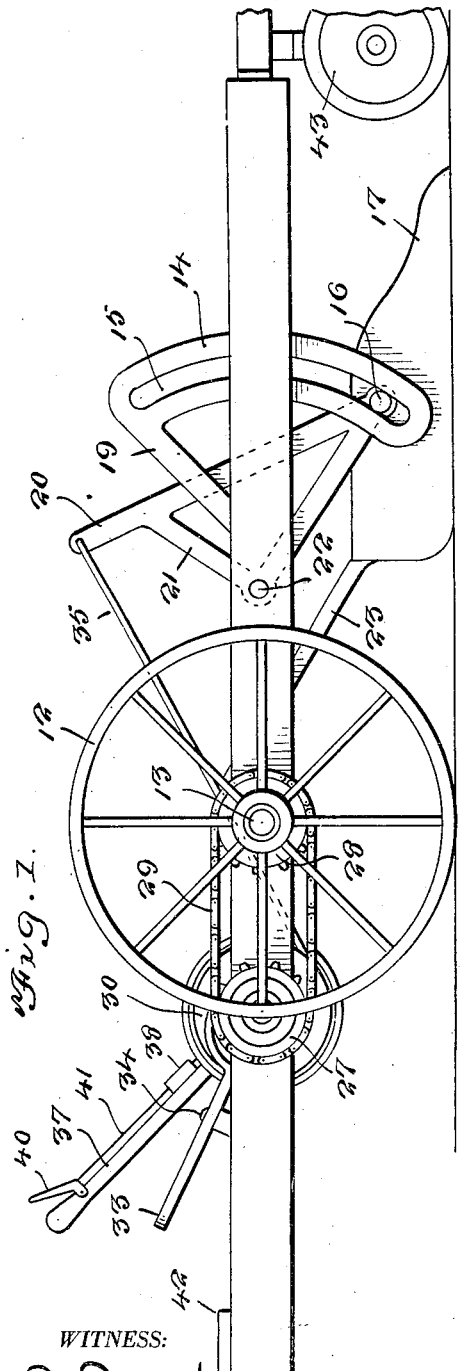
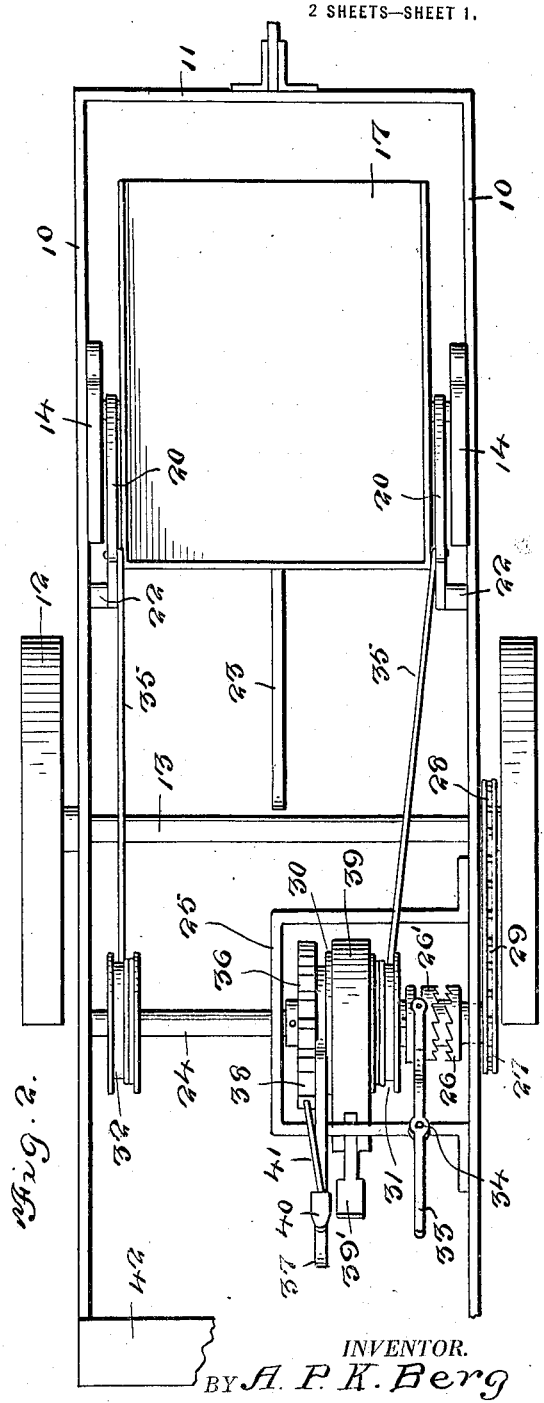
WITNESS:
INVENTOR.
BY A. P. K. Berg
Victor J. Evans
ATTORNEY.

A. P. K. BERG.
ROAD SCRAPER AND LAND LEVELER.
APPLICATION FILED NOV. 28, 1919.
1,351,277.
Patented Aug. 31, 1920.
2 SHEETS—SHEET 2.
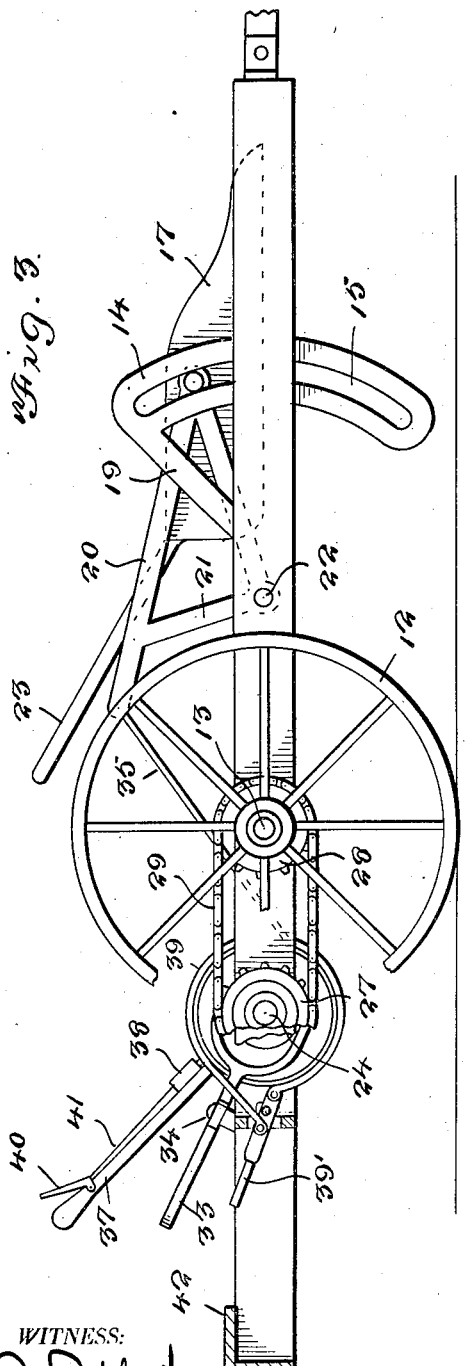
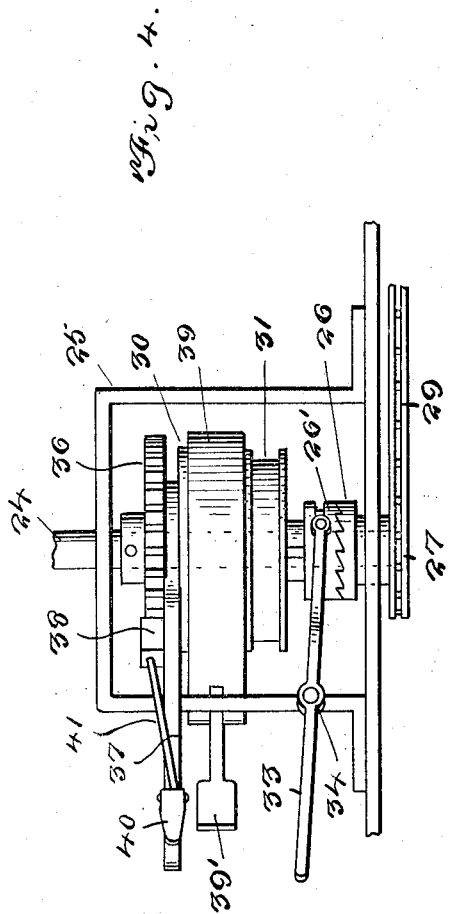
WITNESS:
E. Q. Ruppert.
INVENTOR.
BY A. P. K. Berg
Victor J. Evans
ATTORNEY.

UNITED STATES PATENT OFFICE.

ALEX PETER KARL BERG, OF TURLOCK, CALIFORNIA.

ROAD-SCRAPER AND LAND-LEVELER.

1,351,277.  Specification of Letters Patent.  Patented Aug. 31, 1920.

Application filed November 28, 1919. Serial No. 341,205.

*To all whom it may concern:*

Be it known that I, ALEX PETER KARL BERG, a citizen of Germany, residing at Turlock, in the county of Stanislaus and State of California, have invented new and useful Improvements in Road-Scrapers and Land-Levelers, of which the following is a specification.

This invention relates to land scrapers and levelers and the like, including a shovel, and comprehends the mounting of the latter upon a wheeled frame for both pivotal movement, and movement toward and away from the ground, a lifting mechanism being actuated by one of the tractor wheels.

The nature and advantages of the invention will be better understood when the following detail description is taken in connection with the accompanying drawings, the invention residing in the construction, combination and arrangement of parts as claimed.

In the drawings forming part of this specification, like numerals of reference indicate similar parts in the several views and wherein:—

Figure 1 is a side elevation showing the active position of the parts.

Fig. 2 is a top plan view.

Fig. 3 is a longitudinal sectional view.

Fig. 4 is an enlarged plan view of the clutch mechanism.

The machine constructed in accordance with my invention comprises a frame including spaced parallel sides 10, and end members 11. The frame is mounted upon the wheels 12, the axle for said wheels being indicated at 13.

Secured to each of the side members 10 and projecting above and below the longitudinal edges thereof, is a guide 14 provided with an arcuate shaped slot 15 to receive the pivots of the scraper or shovel 17. Each guide is preferably formed with an extension 19 for supporting the guide, which extension is secured to the frame in any suitable manner. The pivots 16 are also loosely received by the levers 20, one of these levers being pivoted adjacent each guide 14 as shown. Each lever is formed with a substantially D-shaped brace 21 which is pivoted as at 22 upon the adjacent side of the frame. The shovel or scraper 17 is balanced upon the levers 20, so that the shovel may be elevated in a horizontal position in a manner to be hereinafter described, the shovel being tilted or dumped through the instrumentality of the handle 23 when the occasion requires. The shovel may be of any size, or of any suitable construction without departing from the spirit of the invention.

Journaled between the sides 10 of the frame, at an appreciable distance from the axle 13, is a shaft 24. A substantially U-shaped bracket 25 is terminally secured to one of the side members 10 of the frame, and horizontally disposed to lie in a plane therewith. The shaft 24 is passed through the cross piece of the bracket, as shown in Fig. 2. Loosely mounted upon the axle 24 is a clutch member 26 which is associated with a sprocket wheel 27. Trained over this sprocket wheel, and a sprocket wheel 28 fixed upon the rear axle 13, is an endless chain 29, whereby the clutch member 26 is continuously rotated during the movement of the machine. Fixed upon the shaft 24 within the confines of the brackets 25, is a drum 30 having associated therewith a grooved pulley 31. A similar pulley 32 is fixed upon the shaft 24 adjacent the opposite side of the frame. A coöperating clutch member 26' is keyed upon the shaft 24 for sliding movement and is moved into and out of engagement with the clutch member 26 through the instrumentality of a lever 33, which lever is pivoted upon the bracket as at 34. A flexible element 35 is arranged at each side of the frame, and the corresponding ends of these elements are secured to the levers 20, while the opposite ends of the flexible elements are secured to the pulleys 31 and 32 respectively, to be wound thereabout and unwound therefrom as the occasion requires. It is obvious that when the flexible elements are wound about the said pulleys, a pull is exerted upon the levers 20 thus elevating the shovel or scraper 17 from the ground in a horizontal position, the pivots 16 moving upwardly within the slot 15 of the guides 14. When the flexible elements are unwound from the pulleys 31 and 32 respectively, the shovel 17 is allowed to gravitate to an active position as will be apparent.

In practice, when it is desired to use the shovel 17, the latter is arranged in the position illustrated in Fig. 1, during which time the clutch members 26 and 26' are separated. After the shovel has been filled with dirt or other material, and it is desired to elevate the same in spaced relation to the ground, the lever 33 is operated to throw the clutch members 26 and 26' into engagement, whereupon the shaft 24 is rotated from the ground wheel 12. The flexible elements 35 are then wound about the pulleys 31 and 32, exerting a pull upon the levers 20 to elevate the shovel to a position shown in Fig. 3. The shovel is maintained in this position in a manner to be presently described, so that the machine may be moved to the proper destination for the dumping of the contents of the shovel. When desired to dump the contents of the shovel, the handle 23 is actuated to tilt the shovel to a dumping position. When the lever 33 is operated to separate the clutch members, the weight of the shovel will unwind the flexible elements 35 from the pulleys as the shovel gravitates to normal or active position.

Fixed upon the shaft 24 is a ratchet wheel 36 while loosely mounted upon the same shaft at one end is a lever 37. The lever 37 has associated therewith a pawl 38 which is adapted to engage the teeth of the ratchet wheel for holding the shovel in an elevated position as illustrated in Fig. 3. For this purpose the lever 37 must be arranged to repose upon the brackets 25, as shown in Fig. 4, as the lever is not pivoted to any fixed support. When the shovel has been elevated to the position illustrated in Fig. 3, and it is desired to hold the shovel in this position, the foot operated brake 39 is actuated to prevent retrograde movement of the drum 30, until the lever 37 is properly positioned to repose upon the bracket 25 with the pawl 38 engaged with the teeth of the ratchet wheel 36. When it is desired to release the shovel to permit it to gravitate to active position, the pawl 38 must first be disengaged from the ratchet wheel by means of the pivoted elements 40 carried by the lever 37, which element is connected with the pawl by means of the rod 41. The foot pedal 39' of the brake 39, and the lever 37 are disposed within convenient reach of the operator who stands upon the platform 42 arranged at the rear of the machine. The forward end of the machine is designed to be readily and easily coupled to a tractor, or a ground wheel 43 may be readily and easily associated with the frame, should the machine be drawn over the ground by a team. It is of course understood that the wheel 43 is removably attached to the frame. In addition to holding the shovel 17 in an elevated position, the pawl and ratchet mechanism may be used for elevating the shovel by hand, should the occasion require, in which instance, the brake 39, would be applied and held applied to prevent retrograde movement of the shaft 24, while the lever 37 was actuated to obtain the new purchase upon the ratchet wheel as will be readily understood.

While I have shown and described what I consider the preferred embodiment of the invention, I desire to have it understood that I do not limit myself to the exact details shown, and that such changes may be resorted to when desired as fall within the scope of what is claimed.

Having thus described my invention what I claim as new is:—

1. A machine of the class described comprising a wheeled frame, spaced guides carried by the sides of the frame, levers pivoted between their ends on the sides of the frame, a shovel or scraper pivoted between the lower end of said levers, the pivots projecting beyond the levers, and movable within said guides, means actuated from the tractor wheel of the frame for operating said levers to move said shovels toward and away from the ground, and means for holding the shovel elevated.

2. A machine of the character described comprising a wheeled frame, spaced guides supported on said frame, each guide having an arcuate shaped slot, levers pivoted between their ends on said frame, adjacent said guide, a shovel pivoted between the lower end of said levers and balanced to maintain a horizontal position, the pivot of said shovel projecting beyond the levers and movable within the arcuate shaped slots of said guides, means connected with said levers and operable upon movement of the machine for elevating the shovel in spaced relation to the ground, and means for holding said shovel elevated.

3. A machine of the character described comprising a wheeled frame, guides secured to the sides of the frame, levers pivoted between their ends on said sides adjacent the guides, the shovel pivotally associated with said levers between the lower ends thereof and having the pivots therefor movable in said guides, pulleys mounted for rotation, flexible elements connecting said levers with the pulleys, and adapted to be wound upon and unwound from said pulleys, said shovel being elevated in spaced relation to the ground, when the flexible elements are wound about said pulleys, and means including clutch mechanism for controlling the rotation of said pulleys.

4. A machine of the character described comprising a wheeled frame, guides carried by the sides of the frame, levers pivoted between their ends upon said frame, a shovel pivoted between the lower ends of said levers and having the pivots thereof movable within said guides, a shaft journaled between the sides of said frame, means including a clutch for rotating said shaft from the tractor wheel, pulleys fixed on said shaft, flexible elements connecting the pulleys with said levers, whereby the shovel is elevated when the flexible elements are wound about said pulleys, a foot operated brake for preventing retrograde movement of said shaft, and means for holding the shovel elevated independently of said brake.

In testimony whereof I affix my signature.

ALEX PETER KARL BERG.